Patented Sept. 13, 1938

2,130,028

UNITED STATES PATENT OFFICE 2,130,028

AFFINATION OF SUGAR

Gustave T. Reich, Philadelphia, Pa.

No Drawing. Application November 18, 1935,
Serial No. 50,479

12 Claims. (Cl. 127—64)

My invention lies in the stage of the art of sugar refining termed in the trade "affination" which is the removal from the sugar crystals of organic and inorganic impurties by mechanical means. Great expenses have been incurred and much equipment required for the removal of very moderate quantities of impurities and very slight shading of color. The importance of the invention lies in its applicability to the refining of raw sugar.

In the refining of raw sugar, or, in general, of all refining, great expenses have been incurred in processing and equipment for the removal of very small quantities of impurities and color. In general, the raw sugar contains 96% of sugar, 1½% water, 1% invert sugar, 1½% organic and inorganic impurities. The impurities are present as an adhering film of molasses on the surface of the crystals. Therefore, their removal, or at least the removal of the largest part of the impurities can be accomplished by mechanical means. Generally these mechanical means consisted in the so-called "affination", whereby the impurities were removed by means of washing.

The raw sugar entered a mixer called "mingler" which is a scroll conveyor, and provided with blades so as to facilitate the mixing and also forwarding the mixed material called "massecuite". When the raw sugar, or sugar in general, was to be refined, it was mixed in the mingled with a liquor having a density of approximately 50 Brix. The liquor consisted partly of impurities removed from a previous batch of raw sugar, also fresh water used for the removal of the thin adhering film. The cycle was continuous. Part of the liquor called also "raw wash" was removed for further concentration, while the partly diluted liquor was returned for the treatment of more sugar. By the mingling and continuous mixing, the maintenance of a high temperature, approximately 70°–90° C. most of the impurities present upon the crystal surface were removed, and the yield ultimately a raw wash of a purity of 80°–85°. After the removal of the liquor from the crystal, the so-called magma, it was transferred to centrifugals and purged, thus yielding a sugar having a purity of above 98°–99° polarization.

This procedure was quite expensive but notwithstanding was most universally practiced. It has been found that approximately 15–25% of the raw sugar was dissolved in order to remove 1½% of impurities, i. e. from every 1,000 pounds of raw sugar there was dissolved 150–250 pounds of same. Efforts have been made to reduce the wash water; and also to reduce the loss of raw sugar by various means of centrifuging, washing, re-circulating separating fresh wash waters, etc. While they accomplished a part of the desired result, the purity of the raw wash was far too high, and the ratio of dissolved sugar compared to the impurities was also quite excessive.

I have found that instead of starting out with a small quantity of liquid giving a "massecuite", and operating at a high temperature, in my process I get the best results by processing just the reverse as is customary at present.

Instead of taking a large quantity of sugar with a small quantity of liquid, aiming to prevent the loss of sugar, I found that by starting out immediately with a large quantity of liquid, which consisted of a saturated sugar solution to form the wash, and keeping the sugar in suspension, preferably in a ratio greater than that of mush; in fact, it would be advisable to keep a ratio of at least one part of sugar volume to two parts of liquid up to 20, being saturated, or supersaturated, depending upon the quality of sugar to be processed.

While it was customary to treat the sugar with the raw wash in a direct current, I found that just this procedure prevents the progressive increase of impurities in the wash water.

My process consists of treating the raw sugar or any impure sugar on the counter current principle. The wash water being a saturated or super-saturated liquid medium in large excess.

I have found that by starting out with a cold saturated aqueous solution of sugar, as the wash water, and step by step increasing to the temperature, and heating the sugars, and non-sugars in equilibrium, the increase of solubility of the sugar in the hot solution over that in the cold is increased approximately only 20%.

I found that by gradually increasing the temperature and adding in consecutive steps just sufficient water for the dissolving of impurities, I changed the equilibrium from step to step at various temperatures so that at the end of the cycle I obtained on one side a very high purity of washed sugar, while on the other hand a liquid which is practically molasses below 50 purity and Brix of above 80°. So far as I am aware, this procedure has never been practiced or published anywhere in the prior art.

I have found that the wash water actually deposits in the sugar a product, its dissolved sugar. This occurs because it becomes saturated, or in some instances super-saturated, with the molasses of the film on the sugar crystal and becoming incapable to retaining both the molasses and sugar in solution either deposits out the latter or retains it as a suspension.

Another feature of my process is that in the usual procedure lime or other alkali is added so as to maintain an alkali condition in the massecuite. A pH above 7, preferably below 10, is maintained. A high pH has a tendency to destroy the invert sugar. According to my process the alkali comes in contact with the purest sugar, i. e. it enters where the sugar leaves the affinators, thus insuring a better purification, and as the density and impurities of the liquor increases we may add more and more alkali or alkali compound, and the slight step by step increase of the temperature will have very little influence upon the invert sugar, so that under ordinary conditions I am able to carry 100–500% more alkali without decreasing the value of the final product as washed sugar or as final molasses.

It is also possible to treat the washed sugar with phosphoric acid, sulphur dioxide, hyposulphite or materials serving for bleaching purposes, and air any of the treating tanks; add alkali at will, gradually or at once, intermittently, or continuously. By this procedure, I am able to produce a marketable product by simply drying the final washed sugar.

For example, I start out with 1000 gals. of saturated sugar solution and gradually build up the impurities, and after all six or more affinators are charged with this liquid, each one with increasing temperature and increasing impurities, the cycle commences by starting to feed the impure sugar at the end where the temperature is the highest and the impurities the greatest; in other words, while everybody hitherto intended to start with the liquid being the least saturated with impurities, I found that according to my process the best results are obtained by contacting the impure sugar with the liquid having the highest temperature and the highest percentage of impurities.

As the sugar progressively is transferred from one affinator to the other, it comes in contact with a liquid lower in temperature but to which has been added a small percentage of water before entering the affinator; in other words, after leaving the last affinator, impure sugar will be purified completely and will come in contact with the purest liquid and lowest temperature, but in every instance the liquid will be saturated. It might be advisable to interpose a centrifugal between the various affinators so as to remove, step by step, the adhering liquid, thereby assuring a higher purity product. Many changes may be made in my improved process without departing from my invention which is not to be restricted to less than the claims.

I claim:

1. The process of affination of sugar, which comprises passing through a series of receptacles in which are contained the sugar to be affined, a wash water in quantity in excess of the amount of sugar contained in the first receptacle, consisting of a saturated solution of sugar, while the contents of such receptacles are maintained at temperatures that differ from each other in different receptacles, the temperature maintained in the receptacle through which the wash water flows first being the lowest, and that through which it flows last being highest with abrupt and generally step by step increases in temperature in receptacles between the first and last receptacles.

2. The process of affination of sugar, which comprises passing through a series of receptacles, through which the sugar to be affined is caused to flow in one direction, a wash water in greater quantity than the sugar contained in the first of the receptacles into which the wash water is introduced consisting of a saturated sugar solution in the opposite direction to that in which the sugar is caused to flow, maintaining meanwhile in said receptacles a heat, increasing successively from that maintained in the receptacle into which the wash water enters, where it is the lowest, to that from which it is evacuated, where it is the highest.

3. A process of affining sugars, while the sugar and a wash water, the latter being in greater quantity than the sugar, consisting of a saturated aqueous solution of sugar, are mingled in a series of receptacles in countercurrent to each other, comprising maintaining the proportion of sugar to wash water at from two of wash water to one of sugar to be affined, to 20 of wash water to one of sugar to be affined and then passing the wash water successively through the receptacles containing the sugar, the wash water being entered into the receptacle containing the least contaminated sugar the temperature in one receptacle increasing abruptly above that in the receptacle from which the wash water had been drawn.

4. A process for affining sugar that has its crystals contaminated with films, containing, as impurities, soluble non-sugars, by washing the sugar to be affined in batches with a wash in a quantity exceeding that of a batch of sugar to be affined consisting of an at least saturated aqueous sugar solution, that comprises bringing the wash into contact, interruptedly, with batches of sugar, each batch having on its crystals, a film containing a different degree of impurities from the impurities in the films on the crystals of other batches; the wash being brought first into contact with batches of sugar, the crystals of which contain the least amount of impurities, and subsequently and interruptedly, with batches the crystals of which have a progressively greater proportion of soluble impurities, meanwhile increasing the temperature of the wash at each batch, and adding to the wash at each batch sufficient water to maintain its capacity to abstract the impurities, but insufficient to dissolve the sugars on said films, whereby the capacity of the wash to abstract the soluble impurities in the films at each of said batches is increased without increasing to the same extent its capacity to dissolve the sugars in said films.

5. A process for affining sugar that has its crystals contaminated with films containing soluble non-sugar impurities, by washing the sugar to be affined in batches with a wash consisting of an at least saturated aqueous sugar solution greater in quantity than the sugar in a batch, that comprises bringing the wash into contact, interruptedly, with batches of sugar, each batch having, on its crystals, a film containing a different proportion of impurities from the impurities in the films on the crystals of other batches; the wash being brought first into contact with batches of sugar, the crystals of which contain the least amount of impurities, and subsequently and progressively, with batches having a progressively greater proportion of soluble impurities on the films, meanwhile increasing the temperature of the wash at each batch, whereby the capacity of the wash to abstract the soluble non-sugar impurities in the films at each of said batches is increased without increasing to the same extent its capacity to abstract the sugars from said films.

6. A process for affining sugar simultaneously in several batches, the crystals of which sugar are contaminated with films containing soluble non-sugars in which the proportion of non-sugars in the films on the crystals of one batch vary from the proportion of non-sugar on the films of other batches; comprising causing a wash consisting of a saturated sugar solution to pass progressively through these batches, passing first through the batch the films on the crystals of which contain the least proportion of non-sugars and then through batches, the films on the crystals of which contain larger proportions of the non-sugars, maintaining in the batch into which the wash enters first substantially room temperature, and increasing the temperature of th batches, into which the wash enters subsequently, progressively, until a temperature of about 100° C. is reached.

7. The process of affining sugar upon the crystals of which were films consisting in part of soluble non-sugars, by washing the sugar with a wash consisting of a saturated solution of sugar, comprising forming batches, the crystals of one batch having films containing a different proportion of soluble non-sugars from the proportions of non-sugars contained in the other batches through which the wash being of a greater quantity than the sugar contained in a batch is passed, passing the wash progressively, first through the batch in which the crystals of the sugars have a film containing the least proportion of non-sugars and subsequently through batches of sugar the films on the crystals of which contain greater proportions of non-sugars, progressively, the passage of the wash through each batch being intermittent, and the batches being centrifuged after each passage of the wash water through it and each successive batch of sugar being heated to a lower temperature.

8. A process for refining sugar wherein the sugar to be affined has crystals contaminated by films that consist in part of soluble non-sugars, and wherein the sugar to be affined is arranged in several batches, in which the proportion of soluble non-sugars in the films on the crystals varies in different batches; that comprises washing the crystals with a wash consisting of an at least saturated aqueous solution of sugar, and by causing the wash to pass progressively through the several batches of sugar to be affined, at temperatures increasing step by step, the temprature of the wash at each batch being maintained substantially constant for that batch, but the temperatures of the wash water at other batches being higher than at the batch previously treated by the wash water, thereby causing the sugar in the wash water to replace soluble non-sugars in the films.

9. The process defined in claim 8, wherein water is added to the wash during the washing of the sugar, and the quantity thereof is limited to a quantity sufficient to enable the wash to abstract the non-sugars from the film on the crystals, thereby causing the density of the wash to increase progressively, as it passes through the batches of sugar to be affined, and the proportion of sugars to non-sugars in the wash to diminish progressively.

10. The process defined in claim 4, with the additional step of adding an alkali at the point where the wash water makes its first contact with the sugar to be affined.

11. The process defined in claim 4, with the additional step of mingling with the wash water and sugar to be affined at various points along the flow of wash water through the batches, an alkali in proportion with the increase of acidity of the sugar at the point of addition.

12. The process defined in claim 4, wherein the temperature at which the wash water enters the first batch of the sugar to be affined is substantially at atmospheric temperature.

GUSTAVE T. REICH.